(12) United States Patent
Kuntzelman et al.

(10) Patent No.: US 12,110,069 B2
(45) Date of Patent: Oct. 8, 2024

(54) POWER STEERING FLUID FILTER ASSEMBLY

(71) Applicant: Plews, Inc., Dixon, IL (US)

(72) Inventors: Toby Kuntzelman, Winnebago, IL (US); Anthony Holguin, Dixon, IL (US)

( * ) Notice: Subject to any disclaimer, the term of this patent is extended or adjusted under 35 U.S.C. 154(b) by 274 days.

(21) Appl. No.: 16/991,419

(22) Filed: Aug. 12, 2020

(65) Prior Publication Data

US 2022/0048562 A1 Feb. 17, 2022

(51) Int. Cl.
*B62D 5/06* (2006.01)
*B01D 35/02* (2006.01)
*B62D 5/30* (2006.01)

(52) U.S. Cl.
CPC .............. *B62D 5/062* (2013.01); *B01D 35/02* (2013.01); *B62D 5/30* (2013.01)

(58) Field of Classification Search
CPC .......... B62D 5/062; B62D 5/30; B01D 35/02; B01D 35/06; B01D 2201/4084; B01D 35/147
See application file for complete search history.

(56) References Cited

U.S. PATENT DOCUMENTS

| | | | | |
|---|---|---|---|---|
| 4,759,842 A * | 7/1988 | Frees | ..................... | B01D 35/02 210/453 |
| 5,536,402 A * | 7/1996 | Kluhsman | .............. | B01D 29/35 210/232 |
| 8,679,334 B2 * | 3/2014 | Becker | .................. | B03C 1/0332 210/232 |
| 2016/0025248 A1 * | 1/2016 | Peirce | ..................... | F16L 15/04 285/179 |
| 2017/0259196 A1 * | 9/2017 | Foix | ..................... | B01D 35/301 |

* cited by examiner

*Primary Examiner* — Hayden Brewster

(57) ABSTRACT

A power steering fluid filter assembly having a housing defining an interior chamber, an upstream end and downstream end. The housing is substantially cylindrical having a substantially circular cross-section and longitudinal axis and at least one filter element through which fluid flowing through said housing passes. A plurality of inlet nozzles, each of which are selectively removable at the upstream end of the housing, the inlet nozzles having commonly sized cylindrical protrusions for fitting within the housing and differentially sized hose barbs for fitting within differentially sized hoses feeding power steering fluid to the housing. A plurality of outlet nozzles each of which are selectively removable at the downstream end of the housing, the outlet nozzles having commonly sized cylindrical protrusions for fitting within the housing and differentially sized hose barbs for fitting within differentially sized hoses through which power steering fluid exiting the housing passes. The inlet and outlet nozzles are releasably retained at the ends of the housing by, for example, removable clips, threads, or snap rings.

7 Claims, 2 Drawing Sheets

POWER STEERING FLUID FILTER ASSEMBLY

TECHNICAL FIELD OF THE INVENTION

The present invention involves a filter assembly for removing debris from the flow of power steering fluid circulating through a power steering system. The present assembly is configured with differentially sized and removable nozzles to enable the filter to be installed universally in power steering systems with fluid lines of differing sizes.

BACKGROUND OF THE INVENTION

Automotive hydraulic power steering systems are made up of a pump that circulates power steering fluid through a power steering control valve and cylinder in the steering gear of the vehicle and back to a reservoir. Although this is a sealed system, ferrous and nonferrous debris from mashing metal surfaces, seals and the like form and are suspended in the power steering fluid. This debris can cause premature wear or clogging of the various components and hoses which can result in a power steering system failure. Filters are inserted in the power steering fluid circuit which traps the debris. These filters can be of any type usually employed such as, for example, mesh membranes as well as annular magnets, the combination of which can be quite effective in trapping debris and extending the life of the system.

Although some new vehicles are equipped with filters of the type previously described, it is not uncommon to need an aftermarket filter assembly. However, hose lines which are used to circulate the power steering fluid are not uniform. The inside diameters of these lines can vary and, oftentimes, it is difficult to know, in advance of disassembling and removing the filter assembly, whether an off-the-shelf aftermarket filter assembly will possess the appropriate input/output nipples to match any given installation. The result is that aftermarket suppliers are forced to inventory multiple filter assemblies resulting in added costs.

It is thus an object of the present invention to provide a power steering filter assembly which can universally be used with multiple fluid line sizes.

These and further objects will be more readily apparent when considering the following disclosure and appended claims.

SUMMARY OF THE INVENTION

A power steering fluid filter assembly comprising:
a housing defining an interior chamber having an upstream end and downstream end, said housing being substantially cylindrical having a substantially circular cross-section and longitudinal axis and at least one filter element through which fluid flowing through said housing passes;
a plurality of inlet nozzles, each of which are selectively removable at the upstream end of said housing, said inlet nozzles having commonly sized cylindrical protrusions for fitting within said housing and differentially sized hose barbs for fitting within differentially sized hoses feeding power steering fluid to said housing;
a plurality of outlet nozzles each of which are selectively removable at the downstream end of said housing, said outlet nozzles having commonly sized cylindrical protrusions for fitting within said housing and differentially sized hose barbs for fitting within differentially sized hoses through which power steering fluid exiting said housing passes.

In a power steering fluid filter assembly having a housing defining an interior chamber having an upstream end and downstream end, said housing being substantially cylindrical having a substantially circular cross-section and longitudinal axis and at least one filter element which fluid flowing through said housing passes, the improvement comprising:
a plurality of inlet nozzles, each of which are selectively removable at the upstream end of said housing, said inlet nozzles having commonly sized cylindrical protrusions for fitting within said housing and differentially sized hose barbs for fitting within differentially sized hoses feeding power steering fluid to said housing;
a plurality of outlet nozzles each of which are selectively removable at the downstream end of said housing, said outlet nozzles having commonly sized cylindrical protrusions for fitting within said housing and differentially sized hose barbs for fitting within differentially sized hoses through which power steering fluid exiting said housing passes.

A method of installing a filter assembly within a power steering fluid line comprising:
providing a power steering fluid filter assembly comprising:
a housing defining an interior chamber having an upstream end and downstream end, said housing being substantially cylindrical having a substantially circular cross-section and longitudinal axis and at least one filter element through which fluid flowing through said housing passes;
a plurality of inlet nozzles, each of which are selectively removable at the upstream end of said housing, said inlet nozzles having commonly sized cylindrical protrusions for fitting within said housing and differentially sized hose barbs for fitting within differentially sized hoses feeding power steering fluid to said housing;
a plurality of outlet nozzles each of which are selectively removable at the downstream end of said housing, said outlet nozzles having commonly sized cylindrical protrusions for fitting within said housing and differentially sized hose barbs for fitting within differentially sized hoses through which power steering fluid exiting said housing passes;
said method further comprising:
selecting an inlet nozzle that comprises a hose barb sized to snugly fit within a power steering hose line upstream of said filter assembly and retaining the cylindrical protrusion of that nozzle within said housing and selecting an outlet nozzle that comprises a hose barb sized to snugly fit within a power steering hose line downstream of said filter assembly and retaining the cylindrical protrusion of that nozzle within said housing; and
inserting said inlet nozzle barb within said upstream power steering hose line and inserting said outlet nozzle barb within said downstream power steering hose line.

DETAILED DESCRIPTION OF THE INVENTION

Figure 1:
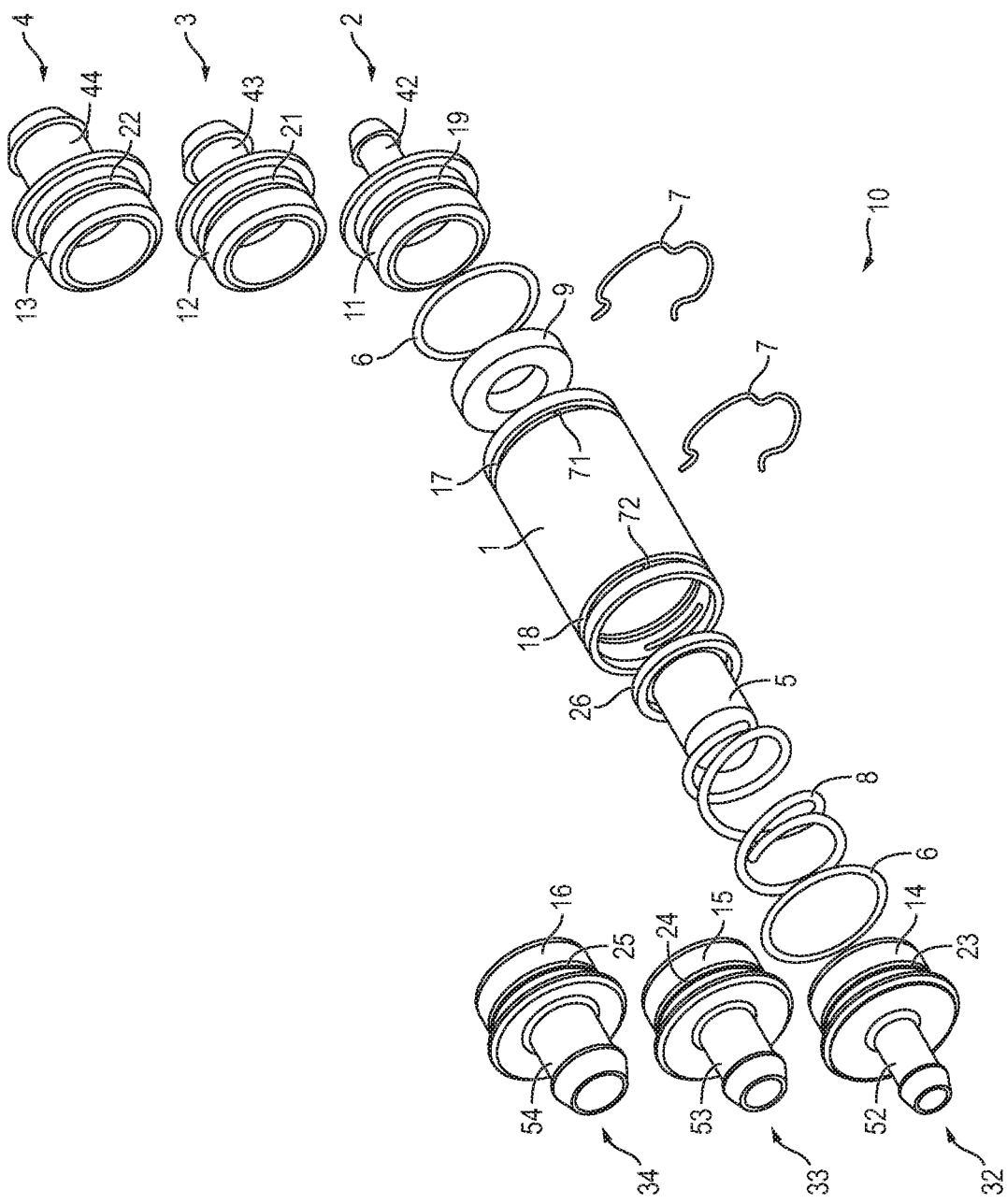
FIG. 1 is an exploded perspective view of the power steering fluid filter assembly of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Power steering fluid filter assembly 10 is provided with upstream end 61 and downstream end 62 and housing 1 being substantially cylindrical having a substantially circular cross-section as shown and longitudinal axis 27 and at least one filter element 5 through which fluid flowing through the housing passes. Power steering fluid filter assembly 10 also optionally includes annular magnetic ring 9 for trapping metal debris passing through power steering fluid filter assembly 10. In operation, in the event that filter element 5 becomes clogged and thus resists fluid flowing through power steering fluid filter assembly 10, filter element 5 compresses helical spring 8, which engages rim 26 of filter element 5, allowing for power steering fluid to travel around but not through filter element 5. Such a configuration is described in U.S. Pat. No. 8,679,334, the disclosure which is incorporated by reference.

As noted previously, in that hose lines through which power steering fluid enters and exits a power steering fluid filter can vary as there is no universally accepted single size for such lines, any supplier of aftermarket power steering fluid filter assemblies are forced to stock multiple units in order to have a suitably sized power steering fluid filter assembly on hand as needed. In order to address this issue, power steering fluid filter assembly 10 is provided with a plurality of inlet nozzles 2, 3 and 4 which are selectively removable at upstream end 61 of housing 1 and a plurality of outlet nozzles 32, 33 and 34 are selectively removable at downstream end 62 of housing 1. Although three inlet nozzles and three outlet nozzles are illustrated, the present invention is not limited to a total of six such nozzles in appreciation of the spirit and scope of the present invention.

Each of inlet nozzles 2, 3 and 4 are provided with commonly sized cylindrical protrusions 11, 12 and 13 for fitting within housing 1 such that cylindrical protrusions 11, 12 and 13 have an outside diameter slightly smaller than the inside diameter of housing 1 for snugly fitting therein and remaining substantially free of leakage of power steering fluid passing through power steering fluid filter assembly 10 enhanced through the use of O-ring 6.

Figure 2:
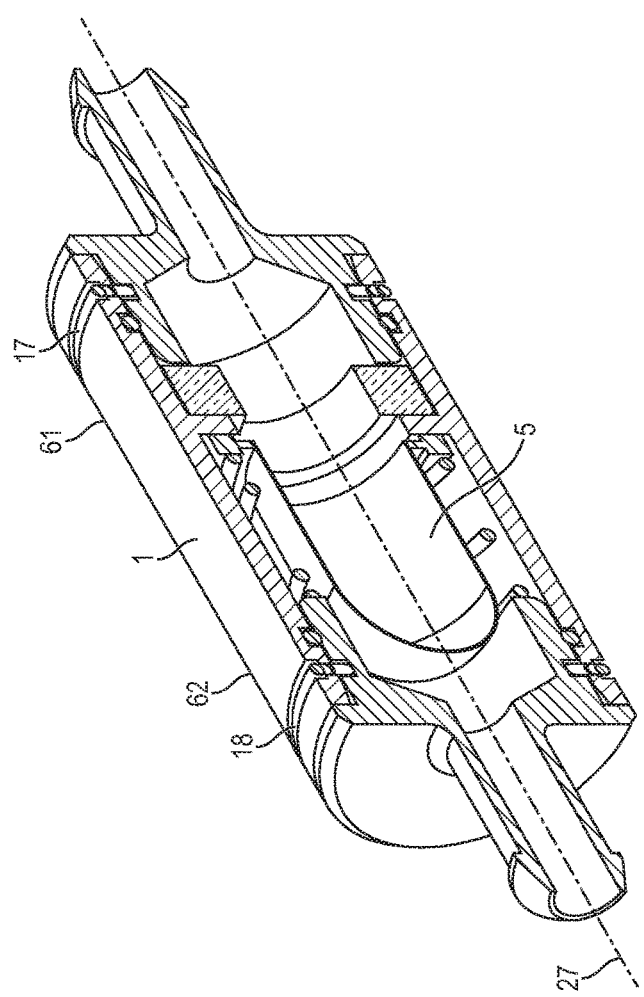
FIG. 2 is a perspective cutaway view of the power steering fluid filter assembly of FIG. 1.

Similarly, each of outlet nozzles 32, 33 and 34 are provided with commonly sized cylindrical protrusions 14, 15 and 16 for fitting within housing 1, such that cylindrical protrusions 14, 15 and 16 have outside diameters slightly smaller than the inside diameter of housing 1 for snugly fitting therein and remaining substantially free of leakage of power steering fluid passing through power steering fluid filter assembly 10 enhanced through the use of O-ring 6. When inserted, each of the inlet and outlet nozzles align with longitudinal axis 27 as shown in FIG. 2.

Figure 3:
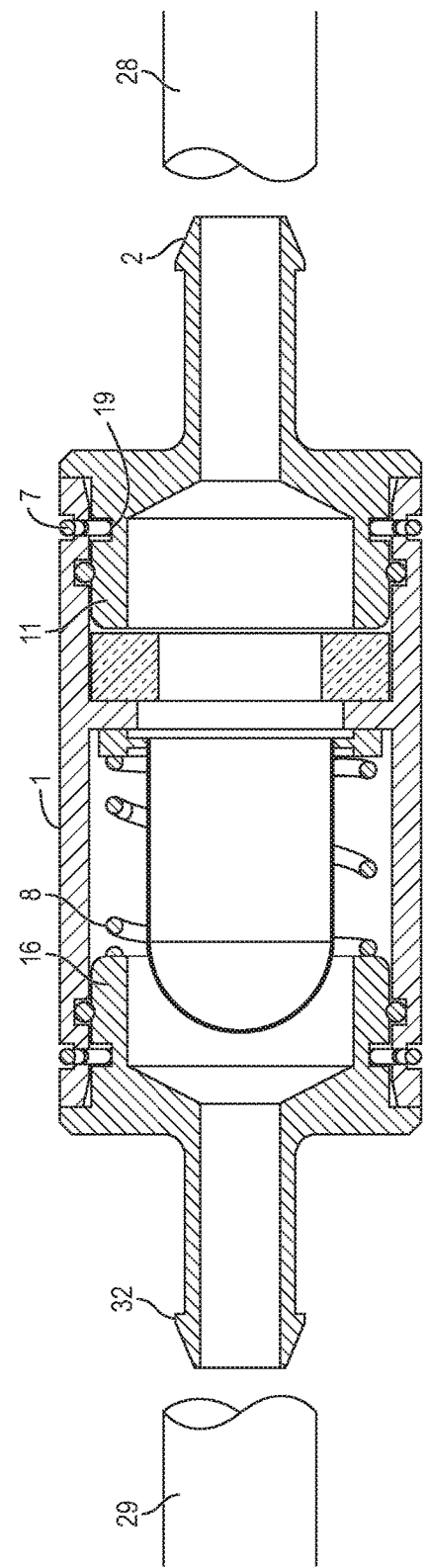
FIG. 3 is a cross-sectional view of the power steering fluid filter assembly of FIG. 1.

As noted a reference to FIG. 1, inlet nozzles 2, 3 and 4 are characterized as possessing hose barbs 42, 43 and 44 which are differentially sized for fitting within differentially sized hoses 28 (FIG. 3). As further noted in reference to FIG. 1, outlet nozzles 32, 33 and 34 are characterized as possessing hose barbs 52, 53 and 54 which are differentially sized for fitting within differentially sized hoses 29. Thus, in operation, once a power steering fluid filter requires replacement, a mechanic or technician would determine the inside diameter of inlet hose 28 and outlet hose 29 and select the appropriate inlet and outlet nozzles to ensure a snug fit between the various nozzle barbs and fluid hose lines. In operation, the inlet and outlet nozzles are releasably retained at the inlet and outlet ends of the housing for enabling the rapid exchange of nozzles as required. An example of suitable retainers are removable clips 7 although threaded connectors and snap ring connectors can also be employed.

When clips are employed, housing 1 is provided with circumferential indent 17 proximate upstream end 61 of housing 1 and indent 18 proximate downstream end 62 of housing 1. Removable clips 7 are sized to fit within indents 17 and 18 and are configured to releasably retain inlet nozzles 2, 3 and 4 at upstream end 61 of housing 1 and downstream nozzles 32, 33 and 34 proximate downstream end 62 of housing 1.

As a preferred embodiment, cylindrical protrusions 11, 12 and 13 of inlet nozzles 2, 3 and 4, respectively, are configured with inlet nozzle indents 19, 21 and 22 which are positioned to align with circumferential indent 17 of housing 1 for selectively receiving removable clip 7, the receipt of which maintains the inlet nozzle cylindrical portions within housing 1. Similarly, cylindrical protrusions 14, 15 and 16 of outlet nozzles 32, 33 and 34, respectively, are configured with outlet nozzle indents 23, 24 and 25 positioned to align with circumferential indent 18 of housing 1 for selectively receiving removable clips 7, the receipt of which maintains the outlet nozzle cylindrical portions within housing 1. Ideally, circumferential indents 17 and 18 possess openings 71 and 72 through which portions of clips 7 pass through for capturing the various nozzle indents as best seen in reference to FIGS. 2 and 3.

In operation, a mechanic or technician need only insert the appropriate inlet and outlet nozzles within housing 1 and maintain each nozzle appropriately by fitting clips 7 within indents 17 and 18 and corresponding nozzle indents. If power steering fluid lines 28 and 29 are sized such as to require nozzles having differentially sized barbs, spring clips 7 can be easily removed allowing for the removal of the nozzles while replacing them with nozzles having barbs which snugly fitting within the power steering fluid lines accordingly.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. A power steering fluid filter assembly comprising:
   a housing defining an interior chamber having an upstream end and downstream end, said housing being substantially cylindrical having a substantially circular cross-section and longitudinal axis and at least one filter element through which fluid flowing through said housing passes;
   a plurality of inlet nozzles (inlet nozzles), each of which are selectively removable at the upstream end of said housing, said inlet nozzles having same sized cylindrical protrusions for fitting within said housing and differentially sized hose barbs for fitting within differentially sized hoses feeding power steering fluid to said housing, wherein the differentially sized hose barbs of the plurality of inlet nozzles change an inlet interior diameter of the housing having the at least one filter element;
   a plurality of outlet nozzles (outlet nozzles), each of which are selectively removable at the downstream end of said housing, said outlet nozzles having same sized cylindrical protrusions for fitting within said housing and differentially sized hose barbs for fitting within differentially sized hoses through which power steering fluid exiting said housing passes, wherein the differentially sized hose barbs of the plurality of outlet nozzles change an outlet interior diameter of the housing having the at least one filter element.

2. The power steering fluid filter assembly of claim 1 further comprising removable clips for releasably retaining said inlet and outlet nozzles to said housing.

3. The power steering fluid filter assembly of claim 2 wherein said housing further comprises circumferential indents proximate its upstream and downstream ends, said removable clips being sized to fit within said indents and configured to releasably retain an inlet nozzle at the upstream end of said housing and an outlet nozzle at the downstream end of said housing.

4. The power steering fluid filter assembly of claim 3 wherein the cylindrical protrusion of each inlet nozzle further comprises an inlet nozzle indent which is positioned to align with said circumferential indent proximate the upstream end of said housing for selectively receiving said removable clip, the receipt of which maintains said inlet nozzle cylindrical protrusion within said housing and wherein the cylindrical protrusion of each outlet nozzle further comprises an outlet nozzle indent which is positioned to align with said circumferential indent proximate the downstream end of said housing for selectively receiving said removable clip, the receipt of which maintains said outlet nozzle cylindrical protrusion within said housing.

5. In a power steering fluid filter assembly having a housing defining an interior chamber having an upstream end and downstream end, said housing being substantially cylindrical having a substantially circular cross-section and longitudinal axis and at least one filter element through which fluid flowing through said housing passes, the improvement comprising:
   a plurality of inlet nozzles (inlet nozzles), each of which are selectively removable at the upstream end of said housing, said inlet nozzles having same sized cylindrical protrusions for fitting within said housing and differentially sized hose barbs for fitting within differentially sized hoses feeding power steering fluid to said housing, wherein the differentially sized hose barbs of the plurality of inlet nozzles change an inlet interior diameter of the housing having the at least one filter element;
   a plurality of outlet nozzles (outlet nozzles), each of which are selectively removable at the downstream end of said housing, said outlet nozzles having same sized cylindrical protrusions for fitting within said housing and differentially sized hose barbs for fitting within differentially sized hoses through which power steering fluid exiting said housing passes, wherein the differentially sized hose barbs of the plurality of outlet nozzles change an outlet interior diameter of the housing having the at least one filter element.

6. The power steering fluid filter assembly of claim 5 further comprising removable clips for releasably retaining said inlet and outlet nozzles to said housing.

7. A method of installing a filter assembly within a power steering fluid line comprising:
   providing a power steering fluid filter assembly comprising:
   a housing defining an interior chamber having an upstream end and downstream end, said housing being substantially cylindrical having a substantially circular cross-section and longitudinal axis and at least one filter element through which fluid flowing through said housing passes;
   a plurality of inlet nozzles (inlet nozzles), each of which are selectively removable at the upstream end of said housing, said inlet nozzles having same sized cylindrical protrusions for fitting within said housing and differentially sized hose barbs for fitting within differentially sized hoses feeding power steering fluid to said housing, wherein the differentially sized hose barbs of the plurality of inlet nozzles change an inlet interior diameter of the housing having the at least one filter element;
   a plurality of outlet nozzles (outlet nozzles), each of which are selectively removable at the downstream end of said housing, said outlet nozzles having same sized cylindrical protrusions for fitting within said housing and differentially sized hose barbs for fitting within differentially sized hoses through which power steering fluid exiting said housing passes, wherein the differentially sized hose barbs of the plurality of outlet nozzles change an outlet interior diameter of the housing having the at least one filter element;

and removable clips for releasably retaining said inlet and outlet nozzles to said housing;

said method further comprising:

selecting an inlet nozzle that comprises a hose barb sized to snugly fit within a power steering hose line upstream of said filter assembly and retaining the cylindrical protrusion of that nozzle within said housing and selecting an outlet nozzle that comprises a hose barb sized to snugly fit within a power steering hose line downstream of said filter assembly and retaining the cylindrical protrusion of that nozzle within said housing; and inserting said inlet nozzle hose barb within said upstream power steering hose line and inserting said outlet hose nozzle barb within said downstream power steering hose line.

\* \* \* \* \*